R. SMITH.

RECIPROCATING PROPELLER FOR VESSELS.

No. 10,222. Reissued Oct. 24, 1882.

Witnesses.
H. E. Lodge
Wm T. Andrews.

Inventor.
Richard Smith.

N. PETERS. Photo-Lithographer, Washington, D. C.

UNITED STATES PATENT OFFICE.

RICHARD SMITH, OF SHERBROOKE, QUEBEC, CANADA.

RECIPROCATING PROPELLER FOR VESSELS.

SPECIFICATION forming part of Reissued Letters Patent No. 10,222, dated October 24, 1882.

Original No. 230,204, dated July 20, 1880. Application for reissue filed July 21, 1882.

*To all whom it may concern:*

Be it known that I, RICHARD SMITH, of Sherbrooke, in the county of Sherbrooke, Province of Quebec, and Dominion of Canada, have invented certain Improvements in Reciprocating Propellers for Vessels, of which the following is a specification.

This invention relates to improvements in propellers for steam-vessels; and it consists in a contractile blade operated by means of a steam-cylinder having within it a double piston, the piston-rod being connected to a rotary spindle, which operates, by means of cranks, connecting-rods, and sliding rod and yoke, the links attached to the back of the blades, whereby the blades are opened or closed and held firmly in either position at pleasure, all of which will be hereinafter more fully described, and set forth in the claims.

Figure 1:
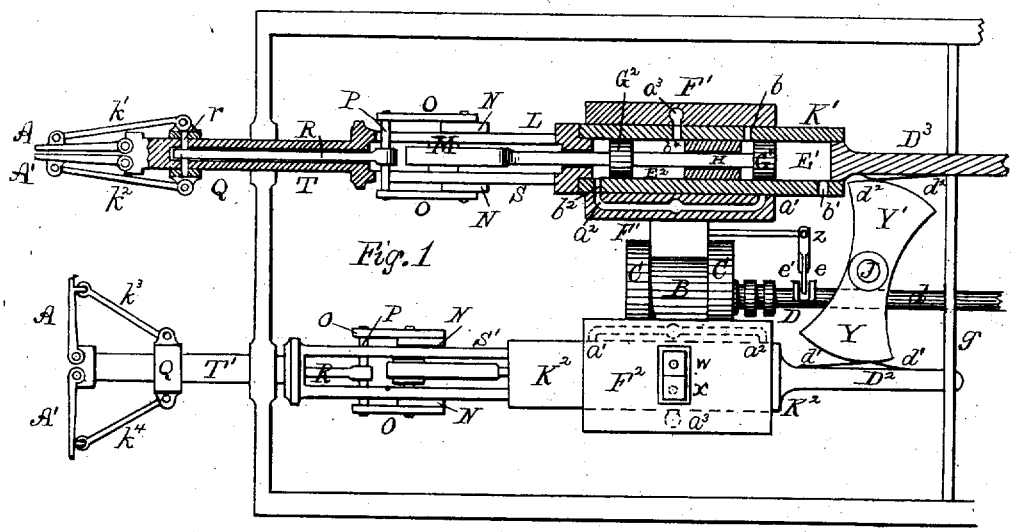
Figure 2:
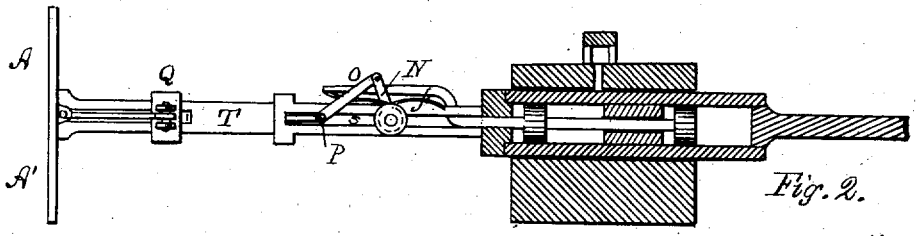
Figure 3:
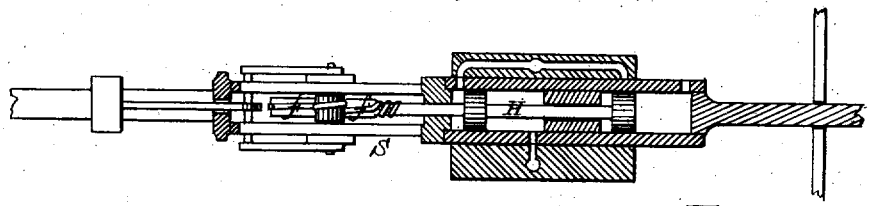
Figure 4:
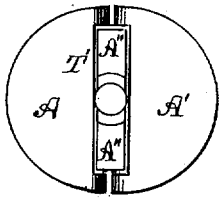

Figure 1 represents a plan view of two sets of apparatus for working two propellers alternately, one of them being in section. Fig. 2 is a side view of one apparatus partly in section and part in elevation. Fig. 3 is a bottom sectional view of Fig. 1, showing the steel straps round the spindle. Fig. 4 is a front or side view of a propeller-blade.

A A′ represent the propeller-blades, which are hinged to a middle bar, $A^2$, Fig. 4, supported firmly upon the end of the shaft T. To the back of the blades are attached the links $k'$ $k^2$, which are hinged to a sliding yoke, Q, in which is a rod, $r$, to which is attached a connecting-rod, R, which moves freely within the hollow shaft T, and having its other end attached to a cross-rod, P, of the arms O O, which arms are connected by cranks N N to the spindle M, the axle of which spindle M operates the cranks N N and causes the rod P to reciprocate with the cross-rod R, which slides to and fro in the slots $s$ of the frame S. The spindle M is caused to rotate by means of the steel straps $f f$, which are attached to it and to the flattened extension of a piston-rod, H, which rod has on it two pistons, G′ and $G^2$, working in the two chambers E′ $E^2$ of the cylinder K′, having a guide-rod, $D^3$, to which are attached two steel straps, $d^2$ $d^2$, connected to one arm of a rocker, Y Y′, supported on a vertical shaft, J, around which shaft are steel straps $d$ $d$, also connected to a rod, D, which is the extension of the piston-rod of a steam-cylinder, C, which furnishes the motive power for propulsion.

The other parts of the apparatus to aid in effecting the propulsion are such as may be found requisite and subordinate to the effectual working of these main features. In the drawings the following are represented as the best means. Each cylinder K′ $K^2$ slides within the steam-chest F′ $F^2$, which chests are provided with ports $a'$ $a^2$ $a^3$, in which cylinders K′ $K^2$ are corresponding ports, $b'$ $b^2$ $b^3$ $b^4$, having at each end, respectively, the chambers, E′ $E^2$, and in which work the pistons G′ $G^2$, connected by the rod H. The outer end of H is flattened and curved, as shown in Fig. 2, and to the concave side are attached the flat steel straps $f f$, which are carried around the spindle M, as seen in Fig. 3, so that as the rod H moves in or out it correspondingly rotates spindle M, and, as before described, carries in a corresponding direction the rod P and yoke Q for closing or opening the propeller.

The whole action is as follows: Steam being admitted to the steam-chest of cylinder C and to the steam-chests F′ $F^2$, the port $b^2$ of sliding cylinder K′ being in juxtaposition to the port $a^2$ of steam-chest F′, the piston $G^2$ is forced to the other end of chamber $E^2$, carrying with it the piston G′ to the other end of the chamber E′, and, as before described, causing the propeller to be opened. The piston B of cylinder C then completes a stroke, and, by means of the arms Y Y′, rod $D^3$, and sliding cylinder K′, which is caused to move in steam-chest F′, the whole apparatus, consisting of frame S, spindle M, and connections up to yoke Q, is forced outwardly, and the open propeller is pressed against the water. So soon as this takes place the other propeller has been closed, as seen in Fig. 1, and is drawn inwardly by the sliding cylinder passing into the position shown at K′, upper part of Fig. 1. The lower part of Fig. 1 shows the propeller at the last end of the outward movement ready to be closed upon the withdrawal of $K^2$. This movement is effected by the stop $e'$ on the rod D, which operates the lever Z to reverse the movement of piston B in cylinder C. The port $b'$ of the sliding cylinder K′ is brought up to port $a'$ of steam-chest F′, and the pistons G′ $G^2$ regain their former positions and close the propeller, as seen in Fig. 1, upper part. By shifting the position of the reversing-valves, one of which is shown at $x$, Figs. 1 and 2, the port $a^3$ receives steam and communicates it alternately by means of the ports $b^3$ and $b^4$ of the sliding cylinder K′ to the opposite sides of the pistons G′ $G^2$, thereby causing the propeller to open at the reverse end of the stroke.

It will be evident that by a modification, each propelling mechanism may be operated by an independent steam-cylinder, the piston-rod of which might be attached to the sliding cylinder K′; also, the shape of the propeller might be either circular, elliptical, or other convenient form, or may be in form of a ring containing within its periphery any convenient number of swiveled blades instead of those shown and described. By this arrangement of a sliding cylinder having within it the double steam-chamber for operating the movements of the propeller-blades it will be seen that the position of the blades is effectually secured either for the forward or backing motion, as the arrangement of the cranks N N, arms O O, and rod R being directly in the same line when in action, the greatest strength is thereby secured.

I claim—

1. The combination of a reciprocating propeller provided with blades to open and close by means of a double piston operating by suitable ports within a steam-cylinder, which latter moves with and forms part of the driving-shaft of said propeller, with a second or primary cylinder, and a piston provided with a yoke or arm to exert reciprocating movements upon the propeller and its connecting-shaft, substantially as and for purposes stated.

2. The combination of the propeller-blades A A′, the yoke Q, operated and controlled by the rod R through the arms O O and cranks N N, the latter being moved and operated by the double pistons G′ $G^2$ within the double cylinder K′ and steam-chest F′, said cylinder moving with and forming part of the propeller-shaft $D^3$, with the double-armed yoke Y Y′, operated by the primary rod $d$, with its piston B and cylinder C, substantially as and for purposes stated.

3. In reciprocating propellers, the combination of the primary cylinder C, with its piston B and rod $d$, to exert reciprocating movements through an intermediary mechanism upon the propeller-shafts $D^2$ $D^3$, and vanes A A′ to propel the vessel forward or backward, said shafts $D^2$ $D^3$ containing or having formed upon them steam-cylinders K′ $K^2$, within which and operated by suitable ports are pistons which effect proper opening and closing of the propeller-blades A A′ by means of the sliding rod R, connected therewith and traveling within the hollow shaft T, substantially as and for purposes stated.

4. The combination of the hinged propeller-blades A A′, connected to the yoke Q, the sliding rod R, operated within the hollow shaft T, the rod P, arms O O, cranks N N, and spindle M, with its piston-rod H working in a suitable cylinder, substantially as and for the purpose described.

5. The combination of the propeller A A′, constructed as described, the yoke Q, operated by means of the rod R, arms O O, cranks N N, spindle M, piston-rod H, pistons G′ $G^2$, and chambers E′ and $E^2$, with a sliding cylinder K′, with its steam chest F′, substantially as and for the purposes hereinbefore described.

In testimony whereof I affix my signature in presence of two witnesses.

RICHARD SMITH.

Witnesses:
H. E. LODGE,
WM. T. ANDREWS.